US008425765B2

(12) United States Patent
Kremer et al.

(10) Patent No.: US 8,425,765 B2
(45) Date of Patent: Apr. 23, 2013

(54) METHOD OF INJECTING SOLID ORGANIC ACIDS INTO CRUDE OIL

(75) Inventors: Lawrence N. Kremer, The Woodlands, TX (US); Jerry J. Weers, Richmond, TX (US); Corina Sandu, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/228,973

(22) Filed: Sep. 9, 2011

(65) Prior Publication Data

US 2012/0043256 A1  Feb. 23, 2012

Related U.S. Application Data

(60) Continuation-in-part of application No. 13/008,615, filed on Jan. 18, 2011, which is a continuation of application No. 12/390,631, filed on Feb. 23, 2009, which is a division of application No. 10/649,921, filed on Aug. 27, 2003, now Pat. No. 7,497,943.

(60) Provisional application No. 60/407,139, filed on Aug. 30, 2002.

(51) Int. Cl.
 *C10G 17/04* (2006.01)
(52) U.S. Cl.
 USPC .................. 208/282; 208/252; 208/254 R
(58) Field of Classification Search ............ 208/251 R, 208/252, 254 R, 282
 See application file for complete search history.

(56) References Cited

U.S. PATENT DOCUMENTS

| | | | |
|---|---|---|---|
| 2,175,095 A | 10/1939 | Stoesser | |
| 2,355,077 A | 8/1944 | Johnson | |
| 2,744,853 A | 5/1956 | Kavanagh et al. | |
| 2,767,123 A | 10/1956 | Hickok et al. | |
| 2,778,777 A | 1/1957 | Powell | |
| 3,023,160 A | 2/1962 | Stedman | |
| 3,150,081 A | 9/1964 | Haslam | |
| 3,167,500 A | 1/1965 | Payne | |
| 3,322,664 A | 5/1967 | Paterson et al. | |
| 3,449,243 A | 6/1969 | Strong, Jr. et al. | |
| 3,582,489 A | 6/1971 | Meadow et al. | |
| 4,164,472 A | 8/1979 | Cheng et al. | |
| 4,167,214 A | 9/1979 | Street, Jr. | |
| 4,276,185 A | 6/1981 | Martin | |
| 4,342,657 A | 8/1982 | Blair, Jr. | |
| 4,432,865 A | 2/1984 | Norman | |
| 4,439,345 A | 3/1984 | Duke | |
| 4,587,005 A | 5/1986 | Siskin et al. | |
| 4,645,589 A | 2/1987 | Krambeck et al. | |
| 4,778,589 A | 10/1988 | Reynolds | |
| 4,778,590 A | 10/1988 | Reynolds et al. | |
| 4,778,591 A | 10/1988 | Reynolds | |
| 4,778,592 A | 10/1988 | Reynolds | |
| 4,785,463 A | 11/1988 | Janc et al. | |
| 4,789,463 A | 12/1988 | Reynolds | |
| 4,818,410 A | 4/1989 | Bellos et al. | |
| 4,853,109 A | 8/1989 | Reynolds | |
| 4,938,876 A | 7/1990 | Ohsol | |
| 4,988,433 A | 1/1991 | Reynolds et al. | |
| 4,992,210 A | 2/1991 | Naeger et al. | |
| 5,062,992 A | 11/1991 | McCullough | |
| 5,078,858 A | 1/1992 | Hart et al. | |
| 5,080,779 A | 1/1992 | Awbrey et al. | |
| 5,104,578 A | 4/1992 | McCullough | |
| 5,114,566 A | 5/1992 | Naeger et al. | |
| 5,174,957 A | 12/1992 | McCullough | |
| 5,176,847 A | 1/1993 | Kremer | |
| 5,282,959 A | 2/1994 | Roling et al. | |
| 5,346,627 A | 9/1994 | Siefert et al. | |
| 5,364,532 A | 11/1994 | Bellos et al. | |
| 5,389,594 A | 2/1995 | Crump et al. | |
| 5,395,536 A | 3/1995 | Brown et al. | |
| 5,637,223 A | 6/1997 | Bellos et al. | |
| 5,853,592 A | 12/1998 | Bellos et al. | |
| 5,948,242 A | 9/1999 | Ohsol et al. | |
| 6,039,865 A | 3/2000 | Mesher | |
| 6,133,205 A | 10/2000 | Jones | |
| 7,497,943 B2 | 3/2009 | Nguyen et al. | |

(Continued)

FOREIGN PATENT DOCUMENTS

| | | |
|---|---|---|
| EP | 1 052 280 A1 | 11/2000 |
| JP | S421992 | 1/1967 |

(Continued)

OTHER PUBLICATIONS

J.H. Gary, et al., Petroleum Refining: Technology and Economics, 3rd Edition, Chapter 4, Crude Distillation, 1994, pp. 39-69, Marcel Dekker, Inc., New York.
PCT International Search Report for International Application No. PCT/US03/27116, Dec. 23, 2003.
J. Weers, et al., "A New Metals Removal Process for Doba Crude Oil," ERTC 9th Annual Meeting, Prague, Czech Republic, Nov. 15, 2004.
J.J. Weers et al., "Calcium Removal from High TAN Crudes," Petroleum Technology Quarterly, Q3, 2005, avilalbe from www.eptq.com.
Baker Petrolite, "Remove Metals, Improve Margins," EXCALIBUR brochure, 2005.

*Primary Examiner* — Walter D Griffin
*Assistant Examiner* — Renee E Robinson
(74) *Attorney, Agent, or Firm* — Mossman Kumar & Tyler PC

(57) ABSTRACT

Solid organic acids may be introduced into hydrocarbon solvents to form dispersions; the dispersions in turn may be introduced into crude oil. A wash water may be added to the crude oil to create an emulsion. The organic acids may transfer metals and/or amines from a hydrocarbon phase into an aqueous phase in an electrostatic desalter which resolves the emulsion into the two phases. Suitable solid organic acids include, but are not necessarily limited to, C2-C4 alpha hydroxyacids, such as, but not necessarily limited to, glycolic acid, malic acid, maleic acid, malonic acid, succinic acid and even sulfamic acid, chloroacetic acid, thiomalic acid, including esters of, polymers of, amine salts of, alkali metal salts of, and/or ammonium salts of all of these acids.

15 Claims, 3 Drawing Sheets

U.S. PATENT DOCUMENTS

| | | | |
|---|---|---|---|
| 2007/0183994 A1* | 8/2007 | Kelly et al. | 424/59 |
| 2008/0032886 A1 | 2/2008 | Yeh et al. | |
| 2008/0264830 A1 | 10/2008 | Goliaszewski | |

FOREIGN PATENT DOCUMENTS

| | | |
|---|---|---|
| JP | S6032888 | 2/1985 |
| JP | 11241074 A | 9/1999 |
| SU | 1666520 A1 | 8/1989 |
| WO | 0052114 A1 | 9/2000 |
| WO | 0140410 A1 | 6/2001 |
| WO | 2007064629 A1 | 6/2007 |
| WO | 2008007847 A1 | 1/2008 |
| WO | 2009113095 A2 | 9/2009 |
| WO | 2011035085 A2 | 3/2011 |

* cited by examiner

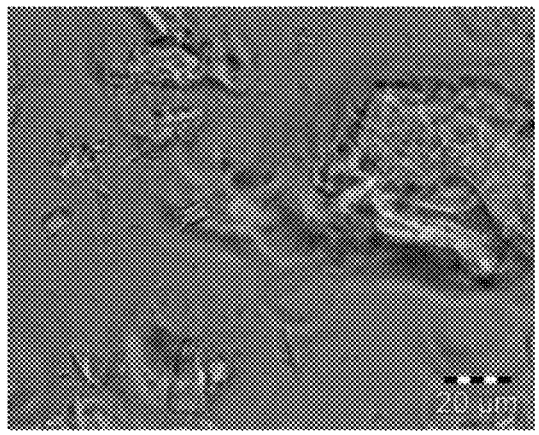
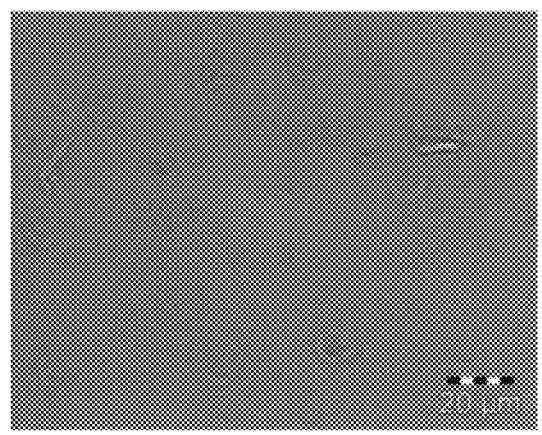
FIG. 1A
FIG. 1B
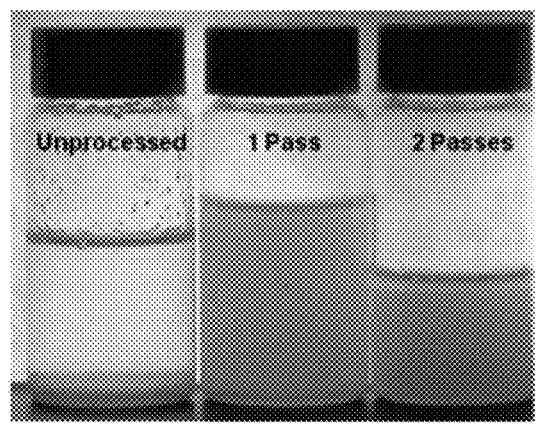
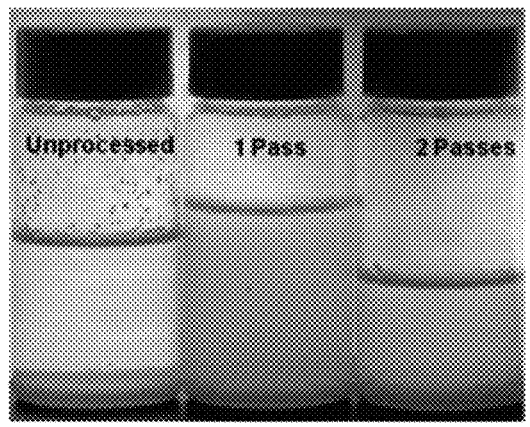
FIG. 2A
FIG. 2B

METHOD OF INJECTING SOLID ORGANIC ACIDS INTO CRUDE OIL

CROSS-REFERENCE TO RELATED APPLICATIONS

This application is a continuation-in-part application of U.S. patent application Ser. No. 13/008,615 filed Jan. 18, 2011, which in turn is a continuation application of U.S. patent application Ser. No. 12/390,631 filed Feb. 23, 2009, which is a divisional application of U.S. patent application Ser. No. 10/649,921 filed Aug. 27, 2003, issued as U.S. Pat. No. 7,497,943 on Mar. 3, 2009, which in turn claims the benefit of U.S. Provisional Application No. 60/407,139 filed Aug. 30, 2002.

TECHNICAL FIELD

The present invention relates to methods and compositions for introducing solid acids into a hydrocarbon, and more particularly relates, in one non-limiting embodiment, to methods and compositions for introducing solid acids, such as $C_2$—$C_4$ hydroxyacids, into a hydrocarbon, such as crude oil, where subsequently metals and/or amines are transferred to an aqueous phase in an emulsion breaking process.

BACKGROUND

In an oil refinery, the desalting of crude oil has been practiced for many years. The crude is usually contaminated from several sources, including, but not necessarily limited to:
  Brine contamination in the crude oil as a result of the brine associated with the oil in the ground;
  Minerals, clay, silt, and sand from the formation around the oil well bore;
  Metals including calcium, zinc, silicon, nickel, sodium, potassium, etc.;
  Nitrogen-containing compounds such as amines used to scrub $H_2S$ from refinery gas streams in amine units, or from amines used as neutralizers in crude unit overhead systems, and also from $H_2S$ scavengers used in the oilfield; and
  Iron sulfides and iron oxides resulting from pipeline and vessel corrosion during production, transport, and storage.

Desalting is necessary prior to further processing to remove these salts and other inorganic materials that would otherwise cause fouling and deposits in downstream heat exchanger equipment and/or form corrosive salts detrimental to crude oil processing equipment. Further, these metals can act as poisons for the catalysts used in downstream refinery units. Effective crude oil desalting can help minimize the effects of these contaminants on the crude unit and downstream operations. Proper desalter operations provide the following benefits to the refiner:
  Reduced crude unit corrosion.
  Reduced crude preheat system fouling.
  Reduced potential for distillation column damage.
  Reduced energy costs.
  Reduced downstream process and product contamination.

Desalting is the resolution of the natural emulsion of water that accompanies the crude oil by creating another emulsion in which about 2 to about 10 wt % percent relative wash water is dispersed into the oil using a mix valve. For relatively lighter crudes, the wash water proportion may range from about 3 to about 5 wt %; for relatively heavier (lower gravity) crudes, the wash water proportion may range from about 5 to about 8 wt %. The emulsion mix is directed into a desalter vessel containing a parallel series of electrically charged plates. Under this arrangement, the oil and water emulsion is exposed to the applied electrical field. An induced dipole is formed on each water droplet within the emulsion that causes electrostatic attraction and coalescence of the water droplets into larger and larger droplets. Eventually, the emulsion resolves into two separate phases—the oil phase (top layer) and the water phase (bottom layer). The streams of desalted crude oil and effluent water are separately discharged from the desalter.

The entire desalting process is a continuous flow procedure as opposed to a batch process. Normally, chemical additives are injected before the mix valve to help resolve the oil/water emulsion in addition to the use of electrostatic coalescence, although some additives or portions of additives may be injected elsewhere. These additives effectively allow small water droplets to more easily coalesce by lowering the oil/water interfacial tension.

Crude oil that contains a high percent of particulate solids can complicate the desalting process. The particulate solids, by nature, would prefer to transfer to the water phase. However, much of the solids in a crude oil from a field exist in tight water-in-oil emulsions. That is, oil-wetted solids in high concentration in the crude may help form tight oil and water emulsions that are difficult to resolve. These tight emulsions are often referred to as "rag" and may exist as a layer between the separated oil and water phases. The rag layer inside the desalter vessel may grow to such an extent that some of it will be inadvertently discharged with the water phase. This is a problem for the waste water treatment plant since the rag layer still contains a high percentage of unresolved emulsified oil.

As mentioned, much of the solids encountered during crude oil desalting consists of iron, most commonly as particulate iron such as iron oxide, iron sulfide, etc. Other metals that are desirably removed include, but are not necessarily limited to, calcium, zinc, silicon, nickel, sodium, potassium, and the like, and typically a number of these metals are present. Some of the metals may be present in a soluble form. The metals may be present in inorganic or organic forms. In addition to complicating the desalter operation, iron and other metals are of particular concern to further downstream processing. This includes the coking operation since iron and other metals remaining in the processed hydrocarbon yields a lower grade of coke. Removing the metals from the crude oil early in the hydrocarbon processing stages is desired to eventually yield high quality coke as well as to limit corrosion and fouling processing problems.

Several treatment approaches have been made to reduce total metal levels and these all center on the removal of metals at the desalter unit. Normally, the desalter only removes water soluble inorganic salts such as sodium or potassium chlorides. Some crude oils contain water insoluble metal organic acid salts such as calcium naphthenante and iron naphthenate, which are soluble or dispersed as fine particulate matter in the oil but not in water.

U.S. Pat. No. 7,497,943 concerns the discovery that metals and/or amines may be removed or transferred from a hydrocarbon phase to a water phase in an emulsion breaking process by using a composition that contains water-soluble hydroxyacids. Suitable water-soluble hydroxyacids include, but are not necessarily limited to glycolic acid, gluconic acid, $C_2$—$C_4$ alpha-hydroxy acids, poly-hydroxy carboxylic acids, thioglycolic acid, chloroacetic acid, polymeric forms of the above hydroxyacids, poly-glycolic esters, glycolate ethers, and ammonium salt and alkali metal salts of these hydroxyacids, and mixtures thereof. The composition may also optionally include at least one mineral acid to reduce the pH of the desalter wash water. The method permits transfer of metals and/or amines into the aqueous phase with little or no hydrocarbon phase undercarry into the aqueous phase. The composition is particularly useful in treating crude oil emulsions, and in removing calcium and other metals therefrom.

However, typically in the '943 method the water-soluble hydroxyacids are dissolved in water and injected into the desalter wash water. These water-based products are subject to freezing in cold weather environments. In addition, sometimes these water-based products are unstable, that is the hydroxyacids may settle out over time.

It would thus be desirable to develop compositions and methods for introducing solid acids, such as solid organic acids or solid alpha-hydroxyacids into a hydrocarbon to be treated, such as crude oil, by using a composition that is stable and not as susceptible to freezing in cold environments.

SUMMARY

In one non-restrictive version, there is provided a method for introducing a solid acid into a hydrocarbon to be treated, where the method includes dispersing a solid acid into a hydrocarbon solvent to form a dispersion. The solid acid may include, but is not necessarily limited to, $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof. The hydrocarbon solvent is different from the hydrocarbon to be treated. The method further involves introducing the dispersion into the hydrocarbon to be subsequently treated, e.g. a crude oil, for instance to transfer metals and/or amines from a hydrocarbon phase to an aqueous phase in a desalter.

Further in another non-limiting version there is provided a method of transferring metals and/or amines from a hydrocarbon phase to a water phase in a process. The method involves, in any order, adding a solid acid dispersion to a crude oil and adding wash water to a crude oil to create an emulsion, where the crude oil comprises metals and/or amines. The solid acid dispersion comprises a solid acid dispersed in a hydrocarbon solvent to form a dispersion, where the solid acid includes, but is not necessarily limited to, $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof. The hydrocarbon solvent is different from the crude oil. The solid acid is present in the emulsion in an amount effective to transfer metals and/or amines from a hydrocarbon phase to a water phase. The method further involves resolving the emulsion into a hydrocarbon phase and an aqueous phase using electrostatic coalescence, where at least a portion of the metals and/or amines are transferred to the aqueous phase.

In another non-limiting embodiment there is provided a stable dispersion that includes a hydrocarbon solvent and a solid acid. Again, the solid acid includes, but is not necessarily limited to, $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof.

There is provided in different non-restrictive embodiment a treated crude oil emulsion that includes crude oil, wash water and a dispersion. The dispersion involves a hydrocarbon solvent and a solid acid that includes, but is not necessarily limited to, $C_2C_4$ alpha-hydroxy acids, sulfamic acid, chloroacetic acid, thiomalic acid, and esters of, polymers of, amine salts of, alkali metal salts of, and ammonia salts of these acids, and mixtures thereof. The hydrocarbon solvent is different from the crude oil.

BRIEF DESCRIPTION OF THE DRAWINGS

FIG. 1A is an optical microphotograph of an unprocessed dispersion of 5 wt % solid malic acid in mineral oil;

FIG. 1B is an optical microphotograph of the dispersion of FIG. 1A after one pass in the H30Z-G10Z chamber of a MICROFLUIDIZER® Processor at 30,000 psi (207 MPa);

FIG. 2A is a photograph of three bottles of 5 wt % solid malic acid in mineral oil, left to right: unprocessed, after one pass in the H30Z-G10Z chamber of a MICROFLUIDIZER® Processor at 30,000 psi (207 MPa), and after two passes in the H30Z-G10Z chamber of a MICROFLUIDIZER® Processor at 30,000 psi (207 MPa), all after one minute;

FIG. 2B is a photograph of the three bottles of FIG. 2A after four hours;

DETAILED DESCRIPTION

Figure 3A:
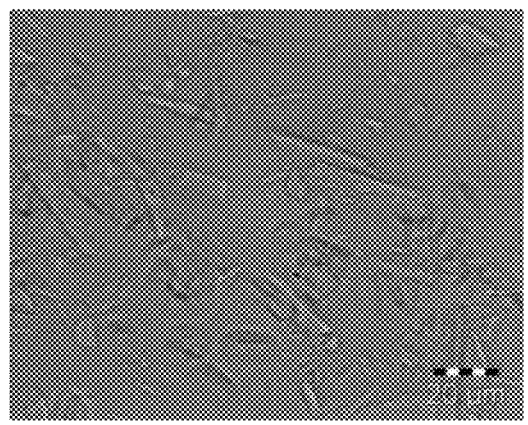
FIG. 3A is an optical microphotograph of an unprocessed dispersion of 5 wt % solid malic acid in Heavy Aromatic Solvent 100.

The inventors have discovered that solid acids, for instance powdered solid acids or solid acids having a size in the range of nanometers or larger may be dispersed in a hydrocarbon solvent. It is desirable to disperse organic acids such as glycolic acid or malic acid (as non-limiting examples) into an oil rather than into water. Water-based products are prone to freezing and being unstable, that is, the solid acids may precipitate out and/or settle over time. Further, since the contaminants to be removed from a hydrocarbon to be treated, such as a crude oil, are initially in the crude oil, the introduction of the solid acids in a hydrocarbon solvent and subsequently into the crude oil facilitates contact of the solid acids with the impurities to be removed. By adding the acids as an oil-based product, they may react faster and/or more efficiently, with the contaminants.

More specifically, powdered acids, such as malic acid or even sulfamic acid, may be dispersed in hydrocarbons, such as kerosene or light cycle oil (LCO). In some cases, it may be necessary to use high shear dispersion technology, such as ultrasonic disruptors and ultrasonic mixers or bead mills. To prevent the dispersed particles from settling, it may be necessary in some non-limiting embodiments to also add a dispersant. Suitable dispersants include, but are not necessarily limited to, carboxymethyl cellulose (CMC), xanthan gum, and polyvinylpyrrolidone (PVP) and combinations thereof. It is possible that in some non-restrictive versions, if the acid is sufficiently small, for instance of nano-scale size, special high shear dispersion technology may not be necessary, and conventional mixing processes may be used, including, but not necessarily limited to, conventional paddle mixing in a tank, a static mixer, and combinations thereof.

The compositions and methods herein involve an alternative way to deliver some of the same acids used in previous techniques where the acids are introduced into wash water, such as those described in U.S. Pat. No. 7,497,943, from which this application claims priority, incorporated herein by reference in its entirety. The water-free additive may be injected into a hydrocarbon to be treated, such as crude oil, without the need for any water, such as wash water, to be present at that point.

It was previously discovered that the addition of glycolic acid (hydroxyacetic acid) and other water-soluble hydroxyacids to a crude oil can significantly reduce the amount of calcium, iron and other metals and/or amines in the hydrocarbon when it is run through a desalter in a refinery. A comparison of the "normal" desalting process on a reference crude oil containing higher than normal amounts of calcium found minimal calcium removal. In contrast, the addition of glycolic acid in levels of up to a 5:1 ratio with calcium, results in much lower metals and/or amine content of the desalted oil. The levels of metals other than calcium such as iron, zinc, silicon, nickel, sodium and potassium were also reduced. The removal of particulate iron in the form of iron oxide, iron sulfide, etc. is a specific, non-limiting embodiment of the method. By "removing" the metals and/or amines from the hydrocarbon or crude is meant any and all partitioning, sequestering, separating, transferring, eliminating, dividing, removing, of one or more metal or amine from the hydrocarbon or crude to any extent, into a water phase.

In one embodiment, the useful acids include a water-soluble hydroxy acid. Hydroxy acids are defined herein as not including or exclusive of acetic acid. Acetic acid has sometimes been used to remove metals as well, but it has a high oil solubility and tends to stay with the hydrocarbon coming from the desalter. The acidity of the acetic acid can then cause corrosion problems in the crude unit. Most of the hydroxy acids will not partition as much into the crude oil, thus reducing downstream concerns. They are also less volatile and do not distill into the crude unit overhead system where they can increase corrosion rates when combined with the water usually present at this location.

In one preferred, non-limiting embodiment, the hydroxyacid is selected from the group consisting of glycolic acid, $C_1$—$C_4$ alpha-hydroxy acids, poly-hydroxy carboxylic acids, thioglycolic acid, chloroacetic acid (melting point=63° C.), polymeric forms of the above hydroxyacids, glycolate ethers, poly-glycolic esters, and mixtures thereof. While thioglycolic acid and chloroacetic acid are not strictly speaking hydroxyacids, they are functional equivalents thereof. For the purposes herein, they are defined as hydroxyacids. The alpha substituent on the $C_1$—$C_4$ alpha-hydroxy acids may be any $C_1$—$C_4$ straight or branched alkyl group. In one non-limiting embodiment, the alpha substituent may be $C_2$—$C_4$ straight or branched alkyl group. Lactic acid (m.p.=53° C.) is optionally not included in this group. Gluconic acid, $CH_2OH(CHOH)_4COOH$, (m.p.=131° C.) is a non-limiting but preferred polymer of glycolic acid. The glycolate ethers may have the formula:

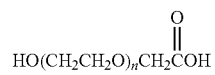

where n ranges from 1-10. The glycolate esters may have a formula:

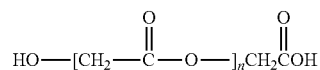

where n is as above. Thioglycolic acid and the ethers of glycolic acid may have the added benefits of a higher boiling point, and possibly increased water solubility. A higher boiling point means the additive will not distill into the distillate fractions in the crude unit and cause corrosion or product quality concerns. The higher water solubility also favors removal of the additive from the crude in the desalter and reduces the amount that may reach the downstream processing units.

In particular, the definition of the solid acids encompasses herein and water-soluble hydroxyacids in particular includes ammonium salts thereof and alkali metal salts thereof (e.g. sodium and potassium salts, etc.) of these hydroxyacids alone or in combination with the other water-soluble hydroxyacids mentioned. Such salts would be formed in the desalter wash water as the system's pH was adjusted with basic pH adjusters such as sodium hydroxide, potassium hydroxide, ammonia, and the like.

In another non-limiting embodiment the water-soluble hydroxyacids do not include citric acid (m.p.=153° C.), malic acid (m.p.=101° C.), tartaric acid (m.p. =171-174° C.; L-tartaric), mandelic acid (m.p.=119° C.), and lactic acid (m.p.=53° C.). However, in different embodiments, one or more of these acids may be usefully included (unless otherwise noted, they should be considered as included). In yet another non-limiting embodiment, the definition of water-soluble hydroxyacids does not include organic acid anhydrides, particularly acetic, propionic, butyric, valeric, stearic, phthalic and benzoic anhydrides.

In yet another non-limiting embodiment, glycolic acid (m.p.=80° C.) and gluconic acid may be used to remove calcium and amines, and thioglycolic acid may be used for iron removal, from crude oil or another hydrocarbon phase.

In one non-limiting embodiment, the solid acids are a powder, defined herein as a dry, bulk solid composed of a large number of very fine particles that may flow freely when shaken or tilted. In one non-restrictive version, the average particle size of a powder is about 5 microns or less, alternatively about 0.5 microns or less, and in another non-limiting embodiment is about 0.1 microns or less.

In general, the smaller the average particle size of the solid acids, the more easily they are dispersed, and in turn, the more easily they contact and react with the metal contaminants and amines of the hydrocarbon which are to be removed therefrom. For these even smaller sizes, the average particle size is about 75 nm or smaller, alternatively, about 50 nm or smaller, and in another non-limiting embodiment about 25 nm or smaller. For the solid acids in this range, they may be incorporated into the hydrocarbon solvent using conventional mixing techniques.

The hydrocarbons into which the solid acids may be dispersed include, but are not necessarily limited to, light cycle oil (LCO), kerosene, aromatic solvents, paraffin oils, diesel oil, crude oil, and mixtures thereof. The hydrocarbon used should be one into which the solid acid is compatible to be dispersed, but which is compatible with the hydrocarbon into which the dispersion is to be introduced, most typically crude oil. In another non-limiting embodiment, it would be suitable to introduce the solid acid particles into a slip stream of crude oil; the crude oil may have enough viscosity to hold the particles in suspension.

The introduction of the solid acids, for instance, solid $C_2$—$C_4$ alpha-hydroxy acids, may be accomplished by using conventional techniques, for instance, but not necessarily limited to, a tank or vessel having a paddle stirrer, a static mixer, a ribbon blender, an industrial high shear mixer or granulator, and the like. It may be necessary to special high shear dispersion technology, including, but not necessarily limited to, ultrasonic mixers or disruptors or bead mills or homogenizers.

In one non-limiting embodiment the amount of solid acid in the hydrocarbon solvent may range from about 5 wt % independently up to about 70 wt % (grams acid/grams hydrocarbon), alternatively from about 20 wt % independently up to about 50 wt %. As used herein, the term "independently" means that any lower threshold may be combined with any upper threshold for the same parameter to give a valid alternative range.

The resulting dispersion is then introduced into a hydrocarbon to be subsequently treated, for instance crude oil to be desalted. The desalting method will be valuable to produce high quality (i.e., high purity) coke from crude that may originally have contained high concentrations of metals and/or amines and solids, including iron-based solids. Further, such method advances the technology by removing inorganic material from the crude oil while discharging little or no oil or emulsion to the waste treatment plant.

It will be understood that the metals removed in the desalting include, but are not necessarily limited to, those of Groups IA, IIA, VB, VIII, IIB and IVA of the Periodic Table (CAS version). In another non-limiting embodiment, the metals include, but are not necessarily limited to calcium, iron, zinc, silicon, nickel, sodium, potassium, vanadium, and combinations thereof. In particular, nickel and vanadium are known poisons for catalysts used in fluid catalytic cracking units (FCCUs) downstream.

The amines removed in accordance with the desalting method may include, but are not necessarily limited to, monoethanolamine (MEA); diethanolamine (DEA); triethanolamine (TEA); N-methylethanolamine; N,N-dimethylethanolamine (DMEA); morpholine; N-methyl morpholine; ethylenediamine (EDA); methoxypropylamine (MOPA); N-ethyl morpholine (EMO); N-methyl ethanolamine, N-methyldiethanolamine and combinations thereof.

It is expected that the acids, in particular hydroxyacids in a non-limiting embodiment, will be used together with other additives including, but not necessarily limited to, corrosion inhibitors, demulsifiers, pH adjusters, metal chelants, scale inhibitors, hydrocarbon solvents, and mixtures thereof, in a commercial process. Metal chelants are compounds that complex with metals to form chelates. It is not believed that the acids, e.g. alpha-hydroxy acids, act as chelates in the removal of metals and amines from the hydrocarbon phase to the aqueous phase. In particular, mineral acids may be used since in some non-limiting embodiments metal removal may be accomplished at an acidic pH. The mineral acids may also be solids and may also be introduced into a hydrocarbon solvent to form a dispersion as described herein. The use of combinations of hydroxyacids, particularly glycolic acid or gluconic acid, and mineral acids may give the best economics in a commercial application. Suitable mineral acids for use in conjunction with the water-soluble hydroxyacids include, but are not necessarily limited to, sulfuric acid, hydrochloric acid, phosphoric acid, nitric acid, phosphorous acid, and mixtures thereof. As noted, in one non-restrictive embodiment, the method is practiced in a refinery desalting process that involves washing the crude emulsion with wash water. In one non-limiting embodiment, the amount of mineral acid used may be sufficient to lower the pH of the wash water to 6 or below. As noted below, in some non-restrictive embodiments, it may be necessary or preferred to lower the pH of the wash water to 5 or below, alternatively to 4 or below. However, in a different, non-restrictive embodiment, the wash water need not be acidic, and in some non-limiting embodiments may be alkaline. In cases where the wash water pH is greater than 8, a benefit of the methods and compositions herein would be that the pH of the resulting brine would be lowered by the solid acid treatment. This procedure would be an alternative method of lowering the brine water pH in cases where direct treating may not be possible. The water-soluble hydroxyacids (and salts thereof) are expected to be useful over a wide pH range, although in some situations it may be necessary or desirable to adjust the pH to achieve the desired contaminant transfer or separation.

It will be appreciated that the necessary, effective or desired proportions of the hydroxyacid and/or the mineral acid will be difficult to predict in advance, since these proportions or dosages are dependent upon a number of factors, including, but not necessarily limited to, the nature of the hydrocarbon, the concentration of metal species and amine to be removed, the temperature and pressure conditions of method, the particular hydroxyacid and mineral acid used, etc. In general, the more of a species, such as calcium, there is to be removed, the more of the reactive acid that must be added. Since many undesirable species are affected, a successful metal removal process may require more reactive acid on a stoichiometric basis than would be indicated by the concentration of only the target species. It may therefore be insufficient to only just add enough acid to get the pH below 6. Nevertheless, in order to give some sense of the proportions that may be used, in one non-limiting embodiment, the composition may comprise down to about 1 wt. % water-soluble hydroxyacid; and up to about 20 wt. % mineral acid, preferably from about 1 independently to about 100 wt. % water-soluble hydroxyacid; and from about 1 independently to about 20 wt. % mineral acid, and most preferably from about 25 independently to about 85 wt. % water-soluble hydroxyacid; and from about 15 independently to about 75 wt. % mineral acid. In some non-limiting embodiments, the mineral acid is optional and may be omitted.

The concentration of the dispersion to be used in the crude oil to be effective is very difficult to predict in advance since it depends on multiple, interrelated factors including, but not limited to, the composition of the crude, the desalting conditions (temperature, pressure, etc.), the flow rate of the crude and its residence time in the desalter, among others. Nevertheless, for the purposes of non-limiting illustration, the proportion of the active acid or hydroxyacid that may be used in the crude (not including any solvent or mineral acid) may range from about 1 independently to about 2000 ppm-w, more preferably from about 10 independently to about 500 ppm-w and will depend on the concentration of metal species to be removed. The organic hydroxy acid reacts stoichiometrically with the organo metal and/or amine species to be removed. Thus an equivalent amount of organic hydroxy acid must be added compared to the concentration of metal species to be removed. A slight excess of the acid will ensure that the reaction goes to completion. In one non-limiting embodiment, the amount of water-soluble hydroxyacid is stoichiometric with the amount of metals and/or amines present, or greater than stoichiometric. For economic reasons the refinery may chose to leave some of the metal and/or amine species in the crude at an acceptably low level of contamination of hydrocarbon. In those cases the treatment level of the hydroxy acids can be correspondingly reduced.

It is desirable that in the practice of method that there be no oil carryunder in the aqueous phase, and that at least oil carryunder is minimized. Further, while it is useful that all of the metals and/or amines transfer to the aqueous phase, in one non-limiting theory, some of the metals and/or amines may be transferred from the oil phase into the rag. This proportion of metals and/or amines is then removed when the rag is cleaned out.

It is also acceptable that in the practice of the method that all of the metals and/or amines transfer to the aqueous phase. In another non-limiting embodiment, 25% or less metal and/or amine is present in the hydrocarbon phase after desalting, preferably 20% or less metal and/or amine remains, most preferably only 10% or less remains. In some cases the refinery may chose to leave higher percentages of metal and/or amine contaminants in the crude if the detrimental effects are judged to be economically acceptable.

The invention will be illustrated further with reference to the following Examples, which are not intended to limit the invention, but instead illuminate it further.

Preparation Examples 1 and 2

Solid malic acid was processed into the indicated hydrocarbon solvent using a MICROFLUIDIZER® Processor at the indicated pressure and number of passes of Table I.

TABLE I

Malic Acid Samples Information

| Ex. | Sample | Processor Chamber | Pressure, psi (MPa) | Pass | Comments |
|---|---|---|---|---|---|
| 1 | 5 wt % malic acid in mineral oil | H30Z-G10Z | 30,000 (207) | 1 2 5 | The size of the malic acid particles appeared to be reduced after processing |
| 2 | 5 wt % malic acid in Heavy Aromatic Solvent 100 | H30Z-G10Z | 30,000 (207) | 1 2 | The particle size reduction was similar in both hydrocarbon solvents |

Shown in FIG. 1A is an optical microphotograph of an unprocessed dispersion of 5 wt % solid malic acid in mineral oil, while FIG. 1B is an optical microphotograph of the dispersion of FIG. 1A after one pass in the H30Z-G10Z chamber of a MICROFLUIDIZER® Processor at 30,000 psi (207 MPa). It may be seen that the particles have been processed to be a smaller size. FIG. 2A is a photograph of three bottles of 5 wt % solid malic acid in mineral oil. The bottle on the left contains an unprocessed dispersion while the bottle in the middle contains the dispersion after one pass in the H30Z-G10Z chamber of a MICROFLUIDIZER® Processor at 30,000 psi (207 MPa). The bottle on the right is the dispersion after two passes in the H30Z-G10Z chamber of a MICROFLUIDIZER® Processor at 30,000 psi (207 MPa). FIG. 2A shows the appearance of the three dispersions after settling for one minute. FIG. 2B is a photograph of the three bottles of FIG. 2A after settling for four hours, demonstrating more settling for the dispersion that was processed in two passes than for the dispersion that was processed in one pass.

Figure 3B:
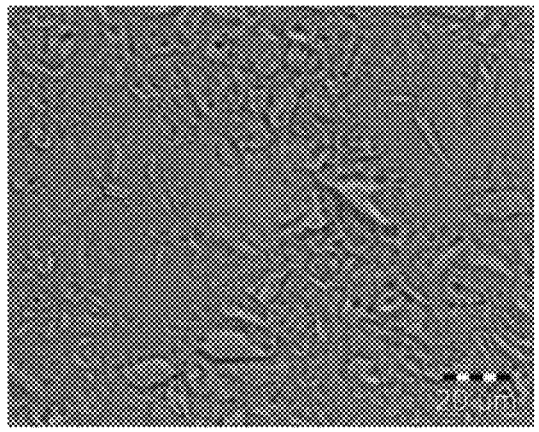
FIG. 3B is an optical microphotograph of the dispersion of FIG. 3A after one pass in the H30Z-G10Z chamber of a MICROFLUIDIZER® Processor at 30,000 psi (207 MPa)
Figure 3C:
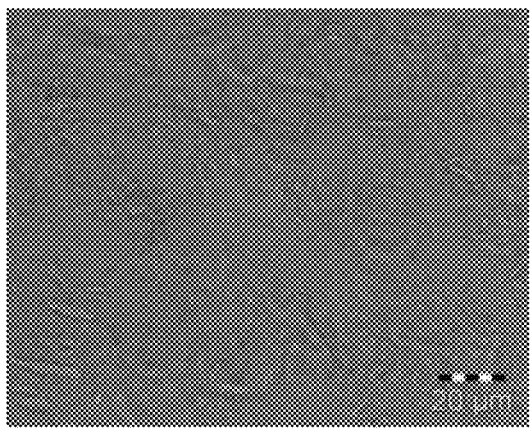
FIG. 3C is an optical microphotograph of the dispersion of FIG. 3A after two passes in the H30Z-G10Z chamber of a MICROFLUIDIZER® Processor at 30,000 psi (207 MPa)
Figure 4A:
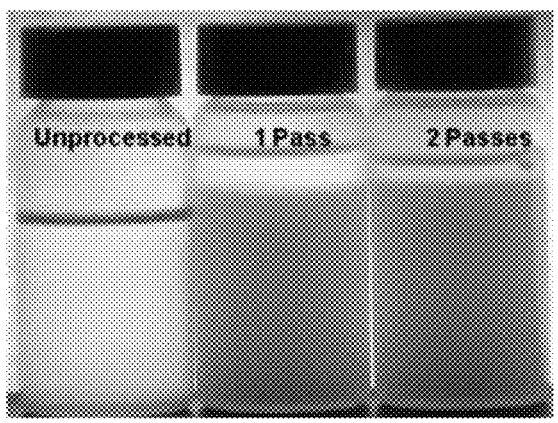
FIG. 4A is a photograph of three bottles of 5 wt % solid malic acid in Heavy Aromatic Solvent 100, left to right: unprocessed, after one pass in the H30Z-G10Z chamber of a MICROFLUIDIZER® Processor at 30,000 psi (207 MPa), and after two passes in the H30Z-G10Z chamber of a MICROFLUIDIZER® Processor at 30,000 psi (207 MPa), all after one minute.
Figure 4B:
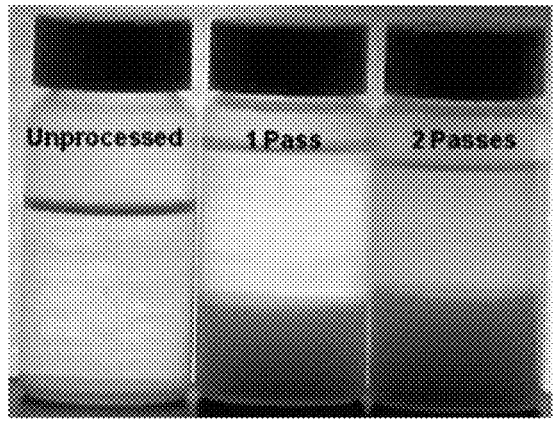
FIG. 4B is a photograph of the three bottles of FIG. 4A after four hours.

FIG. 3A is an optical microphotograph of an unprocessed dispersion of 5 wt % solid malic acid in Heavy Aromatic Solvent 100, where FIG. 3B is an optical microphotograph of the dispersion of FIG. 3A after one pass in the H30Z-G10Z chamber of a MICROFLUIDIZER® Processor at 30,000 psi (207 MPa). FIG. 3C is an optical microphotograph of the dispersion of FIG. 3A after two passes in the H30Z-G10Z chamber of a MICROFLUIDIZER® Processor at 30,000 psi (207 MPa). It may be seen that the particle sizes become smaller with each pass. FIG. 4A is a photograph of three bottles of 5 wt % solid malic acid in Heavy Aromatic Solvent 100. The bottle on the left contains an unprocessed dispersion while the bottle in the middle contains the dispersion after one pass in the H30Z-G10Z chamber of a MICROFLUIDIZER® Processor at 30,000 psi (207 MPa). The bottle on the right shows the dispersion after two passes in the H30Z-G10Z chamber of a MICROFLUIDIZER® Processor at 30,000 psi (207 MPa). FIG. 4A shows the appearance of these three dispersions after settling for one minute. FIG. 4B is a photograph of the three bottles of FIG. 4A after settling for four hours, demonstrating settling for both of the dispersions that were processed in one and two passes.

Calcium Removal Examples 3-5

The sample testing preparation involved the following:
Adding 0.34 wt % of the malic aid dispersion (either in mineral oil or Heavy Aromatic Solvent 100, Examples 1 and 2, respectively) to crude oil.
Adding 5 wt % deionized (DI) water.
Perform EDDA testing (the EDDA Test Method described in U.S. Pat. No. 7,497,943 incorporated herein by reference in its entirety was used).
ICP analysis (Inductively Coupled Plasma) on water samples was performed.
ICP analysis digestion on the crude side was employed.

The results are presented in Table II.

TABLE II

Calcium Removal using Malic Acid in Heavy Aromatic Solvent 100

| Example | 3 Unprocessed | 4 Processed - 1 Pass | 5 Processed - 2 Passes |
|---|---|---|---|
| Water | 238 | 870 | 722 |
| Oil | 75 | 35 | 40 |
| Total | 313 | 905 | 762 |

It may be seen that more calcium is extracted in the water due to treatment with the new formulated product. More calcium is removal from the oil is achieved via treatment with the new product.

In the foregoing specification, the invention has been described with reference to specific embodiments thereof, and has been demonstrated as effective in introducing solid acids, for instance alpha-hydroxy acids into a hydrocarbon solvent to form a dispersion, to be added to a hydrocarbon to be subsequently processed, such as crude oil, as non-limiting examples. However, it will be evident that various modifications and changes may be made thereto without departing from the broader spirit or scope of the invention as set forth in the appended claims. Accordingly, the specification is to be regarded in an illustrative rather than a restrictive sense. For example, specific solid acids, solid hydroxyacids, and combinations thereof with other hydrocarbon solvents, other than those specifically exemplified or mentioned, or in different proportions, falling within the claimed parameters, but not specifically identified or tried in a particular application are within the scope herein. Similarly, it is expected that the inventive compositions will find utility as metal transfer compositions for other fluids besides crude oil emulsions.

The words "comprising" and "comprises" as used throughout the claims is interpreted "including but not limited to".

The present invention may suitably comprise, consist or consist essentially of the elements disclosed and may be practiced in the absence of an element not disclosed. For instance, the method for introducing a solid acid into a hydrocarbon to be treated may consist of or consist essentially of dispersing a solid acid into a hydrocarbon solvent to form a dispersion, and then introducing the dispersion into the hydrocarbon to be treated, where the solid acid is as defined in the claims. Additionally, the stable dispersion may consist of or consist essentially of a solid acid selected from the group consisting of $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof; and a hydrocarbon solvent, where the hydrocarbon solvent is different from the hydrocarbon to be treated. In another non-limiting embodiment, the treated crude oil emulsion may consist of or consist essentially of crude oil, wash water, and solid acid selected from the group consisting of $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof, where the hydrocarbon solvent is different from the crude oil.

What is claimed is:

1. A method for introducing a solid acid into a hydrocarbon to be treated comprising:
dispersing a solid acid into a hydrocarbon solvent to form a dispersion using high shear dispersion technology selected from the group consisting of ultrasonic mixers, disruptors, bead mills, homogenizers and combinations thereof, where the solid acid is selected from the group consisting of $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof, where the hydrocarbon solvent is different from the hydrocarbon to be treated, where the dispersion further comprises at least one dispersant selected from the group consisting of carboxymethyl cellulose, xanthan gum, polyvinylpyrrolidone, and mixtures thereof; and
introducing the dispersion into the hydrocarbon to be treated.

2. The method of claim 1 where the solid organic acid is at least one $C_2$—$C_4$ alpha-hydroxy acid selected from the group consisting of malic acid, lactic acid, glycolic acid, maleic acid, malonic acid, succinic acid, tartaric acid, and thiomalic acid.

3. The method of claim 1 where:
the hydrocarbon solvent is selected from the group consisting of light cycle oil (LCO), kerosene, aromatic solvents, paraffin oils, diesel oil, and mixtures thereof; and
the hydrocarbon to be treated is crude oil.

4. The method of claim 1 where the amount of solid acid in the hydrocarbon solvent ranges from about 5 wt % to about 70 wt %.

5. The method of claim 1 where the solid acid is a powder having an average particle size of about 5 microns or below.

6. A method of transferring metals and/or amines from a hydrocarbon phase to a water phase in a process comprising:
in any order:
adding a solid acid dispersion to a crude oil, where the solid acid dispersion comprises a solid acid dispersed in a hydrocarbon solvent to form a dispersion, where the solid acid is selected from the group consisting of $C_2$—$C_4$ alpha-hydroxy acids, sulfamic acid, chloroacetic acid, thiomalic acid, polymers of, amine salts of, alkali metal salts of, and ammonia salts of these acids, and mixtures thereof, where the hydrocarbon solvent is different from the crude oil, where the dispersion further comprises at least one dispersant selected from the group consisting of carboxymethyl cellulose, xanthan gum, polyvinylpyrrolidone, and mixtures thereof, where the solid acid dispersion is made using high shear dispersion technology selected from the group consisting of ultrasonic mixers, disruptors, bead mills, homogenizers and combinations thereof, and
adding wash water to a crude oil to create an emulsion, where the crude oil comprises metals and/or amines, where the solid acid is present in the emulsion in an amount effective to transfer metals and/or amines from a hydrocarbon phase to a water phase; and
resolving the emulsion into a hydrocarbon phase and an aqueous phase using electrostatic coalescence, where at least a portion of the metals and/or amines are transferred to the aqueous phase.

7. The method of claim 6 where in the solid acid dispersion, the solid acid ranges from about 5 wt % to about 70 wt % of the dispersion.

8. The method of claim 6 where the solid acid is present in the emulsion in an amount ranging from about 1 to about 2000 ppm.

9. The method of claim 6 where the hydrocarbon solvent is selected from the group consisting of light cycle oil (LCO), kerosene, aromatic solvents, paraffin oils, diesel oil, crude oil, and mixtures thereof.

10. A treated crude oil emulsion comprising:
crude oil;
a dispersion comprising:
a solid acid selected from the group consisting of $C_2$—$C_4$ alpha-hydroxy acids, sulfamic acid, chloroacetic acid, thiomalic acid, and esters of, polymers of, amine salts of, alkali metal salts of, and ammonia salts of these acids, and mixtures thereof, where the hydrocarbon solvent is different from the crude oil;
a hydrocarbon solvent; and
at least one dispersant selected from the group consisting of carboxymethyl cellulose, xanthan gum, polyvinylpyrrolidone, and mixtures thereof,
where the dispersion is made using high shear dispersion technology selected from the group consisting of ultrasonic mixers, disruptors, bead mills, homogenizers and combinations thereof; and
wash water.

11. The treated crude oil emulsion of claim 10 where in the solid acid dispersion, the solid acid ranges from about 5 wt % to about 70 wt % of the dispersion.

12. The treated crude oil emulsion of claim 10 where the solid acid is present in the treated crude oil emulsion in an amount ranging from about 1 to about 2000 ppm.

13. The treated crude oil emulsion of claim 10 where the solid organic acid is at least one $C_2$—$C_4$ alpha-hydroxy acid selected from the group consisting of malic acid, lactic acid, glycolic acid, maleic acid, malonic acid, succinic acid, tartaric acid, and thiomalic acid.

14. The treated crude oil emulsion of claim 10 where the hydrocarbon solvent is selected from the group consisting of light cycle oil, kerosene, aromatic solvents, paraffin oils, diesel oil, and mixtures thereof.

15. The treated crude oil emulsion of claim 10 where the amount of solid acid in the hydrocarbon solvent ranges from about 5 wt % to about 70 wt %.

* * * * *

UNITED STATES PATENT AND TRADEMARK OFFICE
CERTIFICATE OF CORRECTION

| | | |
|---|---|---|
| PATENT NO. | : 8,425,765 B2 | Page 1 of 1 |
| APPLICATION NO. | : 13/228973 | |
| DATED | : April 23, 2013 | |
| INVENTOR(S) | : Kremer et al. | |

It is certified that error appears in the above-identified patent and that said Letters Patent is hereby corrected as shown below:

In the Specifications

Column 3, line 66, please delete "C2C4" and insert therefore -- C2-C4 --.

Signed and Sealed this
Thirteenth Day of May, 2014

Michelle K. Lee
*Deputy Director of the United States Patent and Trademark Office*